United States Patent
Gokhale et al.

(10) Patent No.: US 7,596,586 B2
(45) Date of Patent: Sep. 29, 2009

(54) SYSTEM AND METHOD FOR EXTENDED MEDIA RETENTION

(75) Inventors: Parag Gokhale, Ocean, NJ (US); Yanhui Lu, Chester Springs, PA (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 10/818,750

(22) Filed: Apr. 5, 2004

(65) Prior Publication Data

US 2005/0033755 A1    Feb. 10, 2005

Related U.S. Application Data

(60) Provisional application No. 60/460,235, filed on Apr. 3, 2003.

(51) Int. Cl.
*G06F 17/30* (2006.01)
*G06F 12/00* (2006.01)
*G06F 17/00* (2006.01)

(52) U.S. Cl. .................................. 707/204; 707/206
(58) Field of Classification Search ............... 707/206; 379/88.22
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A * | 1/1994 | Kenley et al. | ............... 707/204 |

(Continued)

FOREIGN PATENT DOCUMENTS

EP    0 259 912    3/1988

(Continued)

OTHER PUBLICATIONS

Ashton et al., "Two decades of policy-based storage management for the IBM mainframe computer", www.research.ibm.com, 19 pages, published Apr. 10, 2003, printed Jan. 3, 2009.*

(Continued)

*Primary Examiner*—Neveen Abel-Jalil
*Assistant Examiner*—Jacob F Bétit
(74) *Attorney, Agent, or Firm*—Perkins Coie LLP

(57) ABSTRACT

The present invention provides systems and methods for extending media retention. Methods are provided in which a set of aging preferences are obtained. Data elements of a data set stored on storage media are evaluated against the aging preferences to determine whether each of the data elements satisfy the aging preferences. Each of the data elements that is determined to satisfy the aging preferences is aged. Aging can include freeing a portion of storage media, previously used to store a data element, for other storage usage.

8 Claims, 3 Drawing Sheets

U.S. PATENT DOCUMENTS

| | | | |
|---|---|---|---|
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,875,481 | A * | 2/1999 | Ashton et al. ............... 711/165 |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,958,005 | A | 9/1999 | Thorne et al. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem |
| 6,094,416 | A | 7/2000 | Ying |
| 6,131,095 | A | 10/2000 | Low et al. |
| 6,131,190 | A | 10/2000 | Sidwell |
| 6,137,864 | A | 10/2000 | Yaker |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,304,880 | B1 * | 10/2001 | Kishi ......................... 707/200 |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,789,161 | B1 | 9/2004 | Blendermann et al. |
| 6,973,553 | B1 * | 12/2005 | Archibald et al. ............ 711/162 |
| 7,103,731 | B2 * | 9/2006 | Gibble et al. ............... 711/156 |
| 7,103,740 | B1 * | 9/2006 | Colgrove et al. ............ 711/162 |
| 7,107,395 | B1 * | 9/2006 | Ofek et al. .................. 711/112 |
| 7,155,465 | B2 * | 12/2006 | Lee et al. .................... 707/204 |
| 7,246,140 | B2 * | 7/2007 | Therrien et al. ............. 707/202 |
| 7,293,133 | B1 * | 11/2007 | Colgrove et al. ............ 711/111 |
| 7,467,167 | B2 * | 12/2008 | Patterson .................... 707/204 |
| 2002/0004883 | A1 | 1/2002 | Nguyen et al. |
| 2002/0049778 | A1 * | 4/2002 | Bell et al. .................... 707/200 |
| 2002/0087822 | A1 * | 7/2002 | Butterworth ................. 711/170 |
| 2003/0196036 | A1 * | 10/2003 | Gibble et al. ............... 711/111 |
| 2003/0225800 | A1 * | 12/2003 | Kavuri ........................ 707/204 |
| 2004/0107199 | A1 * | 6/2004 | Dalrymple et al. .......... 707/100 |
| 2004/0193953 | A1 * | 9/2004 | Callahan et al. ............... 714/15 |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| WO | 95/13580 | 5/1995 |
| WO | 99/12098 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4, (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and the recitation in claim 5).

Recycle Bin (Windows), Sep. 16, 2007, Wikipedia, pp. 1-3.

* cited by examiner

SYSTEM AND METHOD FOR EXTENDED MEDIA RETENTION

RELATED APPLICATIONS

This application claims priority to Provisional Application No. 60/460,235, filed Apr. 3, 2003, the entirety of which is hereby incorporated by reference.

This application is related to the following patents and pending applications, each of which is hereby incorporated herein by reference in its entirety:

U.S. Pat. No. 6,418,478, titled PIPELINED HIGH SPEED DATA TRANSFER MECHANISM, issued Jul. 9, 2002, attorney docket number 4982/6;

application Ser. No. 09/610,738, titled MODULAR BACKUP AND RETRIEVAL SYSTEM USED IN CONJUNCTION WITH A STORAGE AREA NETWORK, filed Jul. 6, 2000, attorney docket number 4982/8;

application Ser. No. 09/774,268, titled LOGICAL VIEW AND ACCESS TO PHYSICAL STORAGE IN MODULAR DATA AND STORAGE MANAGEMENT SYSTEM, filed Jan. 30, 2001, attorney docket number 4982/10;

application Ser. No. 60/409,183, titled DYNAMIC STORAGE DEVICE POOLING IN A COMPUTER SYSTEM, filed Sep. 9, 2002, attorney docket number 4982/18PROV;

application Ser. No. 10/303,640, titled SELECTIVE DATA REPLICATION SYSTEM AND METHOD, filed Nov. 25, 2002, attorney docket number 4982/21; and application Ser. No. 60/460,234, titled SYSTEM AND METHOD FOR PERFORMING STORAGE OPERATIONS IN A STORAGE NETWORK, filed Apr. 3, 2003, attorney docket number 4982/35P.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to performing storage operations on electronic data in a computer network. More particularly, the present invention relates to systems and methods for conserving removable media usage in a storage network.

Current storage management systems perform many different types of storage operations including backup operations, restore operations, and archive operations. For example, during a backup operation, data stored on a client computer or other system is communicated via a network or other communication means to a storage device such as a tape drive, optical library, Redundant Arrays of Inexpensive Disks (RAID), CD-ROM jukebox, or other device. Clients are backed up periodically, and a number of different systems and methods exist for backing up client data.

For example, rather than backup all of the data on a client every time a backup is performed (also known as a full backup), incremental backups are sometimes performed copying only those blocks of data on the client which have changed since a prior backup. Thus, a system might initially make a full backup of a client and then only make incremental backups for a given period until the next full backup is scheduled.

One advantage of incremental backups is reduced storage media usage. For example, if a full backup utilizes one entire tape, then performing a daily full backup will consume approximately 30 tapes in a month. If a daily incremental backup only consumes ⅙ of a tape, however, and full backups are only performed once per week between incremental backups, then only about 8 tapes would be required—a savings of 22 tapes. Thus, incremental backups are a widely used form of backing up client data in current storage management systems.

Once the data has been backed up, however, even with incremental backups, it is not generally retained indefinitely since this would, among other things, use an extremely high number of tapes or other storage media over time. Instead, aging rules are often applied and backed up data is frequently deleted or moved to other media after a specified period of time. For example, data might be backed up daily for a month, then only monthly copies kept for a year, and then only yearly copies kept for 7 years until the data is eventually deleted.

When data is aged, the backed up data is often copied from one set of storage media to another set of media using a variety of techniques. The original tapes which stored the original backed up data (the primary copy) may then be returned to a "scratch pool" of available media for reuse. For example, one common technique used to copy backup data and other data is to perform an auxiliary copy. An auxiliary copy generally copies data from one set of media, such as a tape set storing full and incremental backups for given time period, to another set of media generally using a network pathway, such as a storage area network or other network, dedicated to performing storage operations. The tape set or other media which stored the original incremental backups (or possibly all data copied by the auxiliary copy) is then returned to the scratch pool for reuse.

One drawback with aging and copying backup copies of data is that the additional copies require additional sets of media. Thus, for example, three additional tapes are required to perform an auxiliary copy of a backup copy containing a full backup on one tape and incremental backups on two additional tapes—the three original tapes are copied to three additional tapes. One possible solution is to perform a selective auxiliary copy which copies only the full backup, but even this method requires at least one tape in addition to the tapes used for storage of data on the primary backup copy.

There is thus a need for systems and methods which reduce removable media usage during aging operations and other operations in storage management systems.

SUMMARY OF THE INVENTION

In some embodiments, the present invention provides systems and methods for extending media retention.

In one embodiment, the invention provides a method for extending storage media retention, the storage media including a data set including a plurality of data elements. The method includes obtaining a set of aging preferences. The method further includes evaluating each of the data elements against the aging preferences to determine whether each of the data elements satisfies the aging preferences. The method further includes aging each of the data elements which is determined to satisfy the aging preferences.

In another embodiment, the invention provides a method for extending storage media retention, the storage media including a plurality of storage elements including a data set. The method includes obtaining a set of aging preferences. The method further includes evaluating data stored on each of the storage elements against the aging preferences to determine whether data on each of the storage elements is to be aged. The method further includes, for each storage element containing only data to be aged, returning the storage element to a scratch pool for reuse.

In another embodiment, the invention provides a method for extending storage media retention, the storage media storing a data set including a plurality of data elements. The method includes obtaining a set of aging preferences. The method further includes evaluating, from an index, index data relating to each of the data elements against the aging preferences to determine whether each of the data elements satisfies the aging preferences. The method further includes aging each of the data elements which are determined to satisfy the aging preferences by deleting data in the index associated with data elements to be aged.

In another embodiment, the invention provides a system for extending retention of storage media. The system includes a storage device and a processor. The processor is for obtaining a set of aging preferences; evaluating, from an index, index data relating to each of a set of data elements stored in the storage device against the aging preferences to determine whether each of the data elements satisfies the aging preferences; and aging each of the data elements which is determined to satisfy the aging preferences by deleting, from the index, index data associated with data elements to be aged.

In another embodiment, the invention provides a system for extending retention of storage media. The system includes one or more storage managers with access to aging preferences. The system further includes a storage device storing data elements of a data set. The system further includes one or more media agents, communicatively coupled to the storage manager and the storage device, and including one or more indices, the indices containing information associated with the data elements. The one or more media agents cause evaluation of data from the indices relating to each of the data elements against the aging preferences to determine whether each of the data elements satisfies the aging preferences, and cause the storage device to age each of the data elements which is determined to satisfy the aging preferences.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
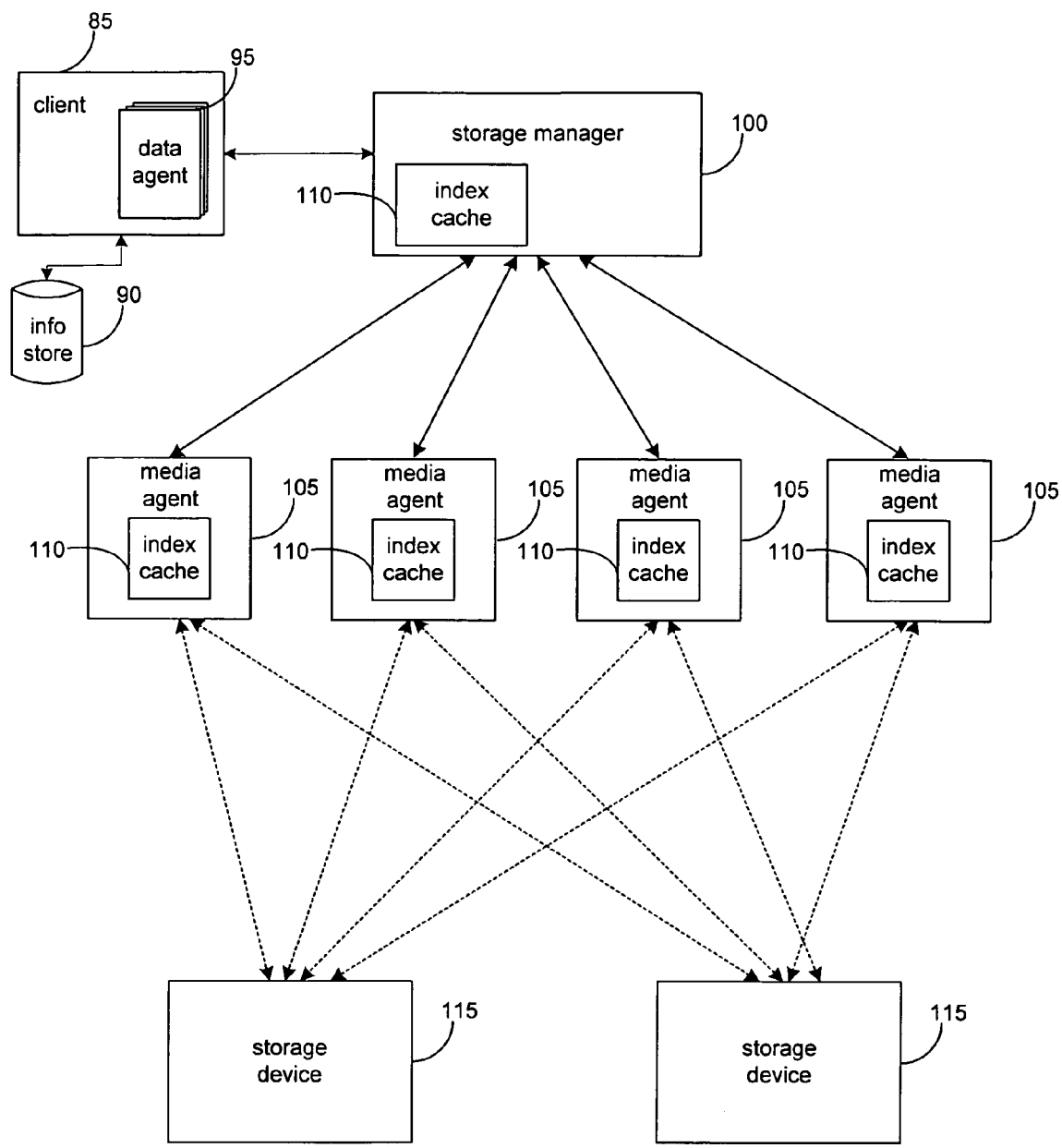
FIG. 1 is a block diagram of a network architecture for a system to perform storage operations on electronic data in a computer network according to an embodiment of the invention.
Figure 2:
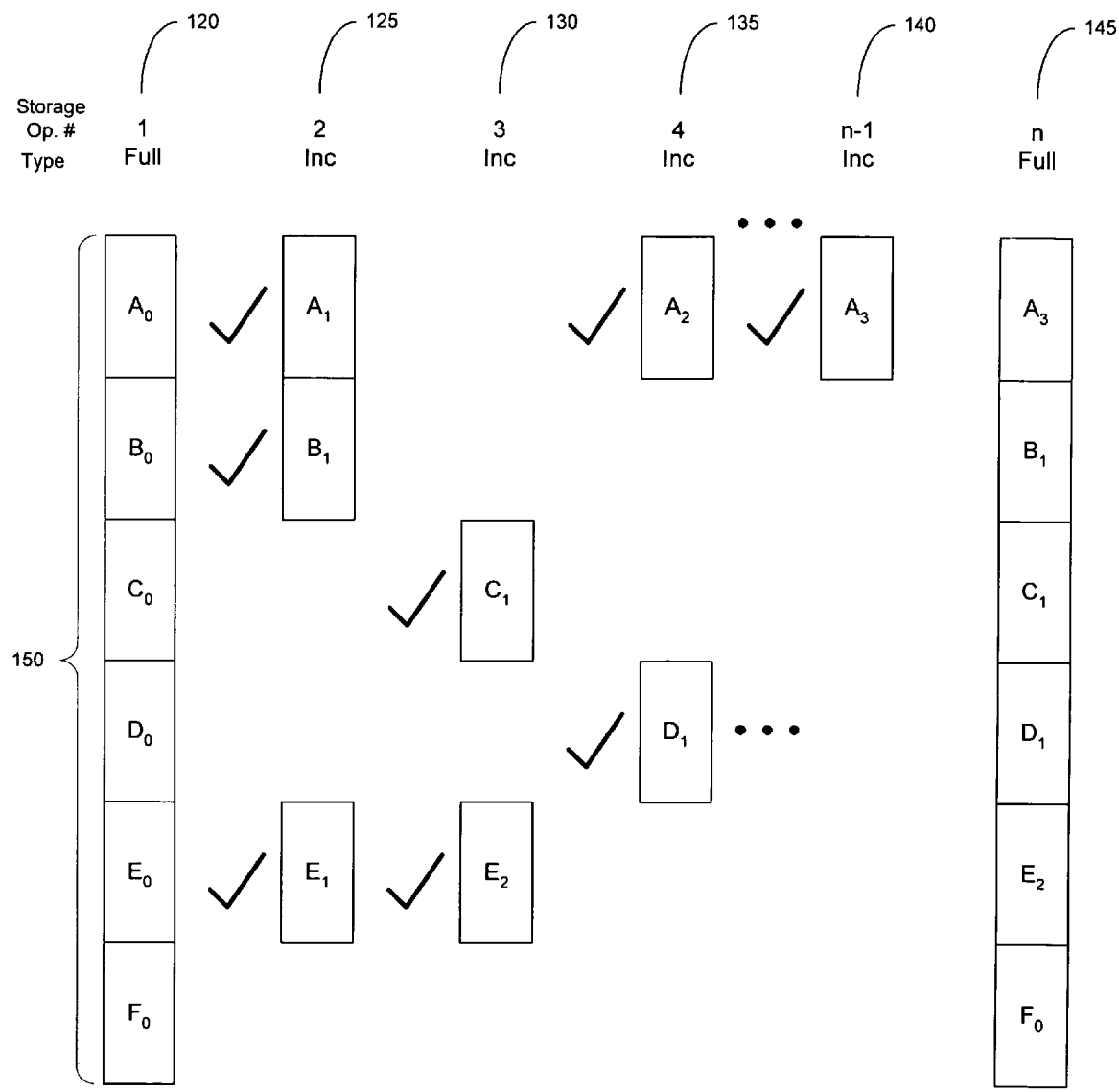
FIG. 2 is a block diagram depicting incremental block level changes occurring in an exemplary series of backups according to an embodiment of the invention.
Figure 3:
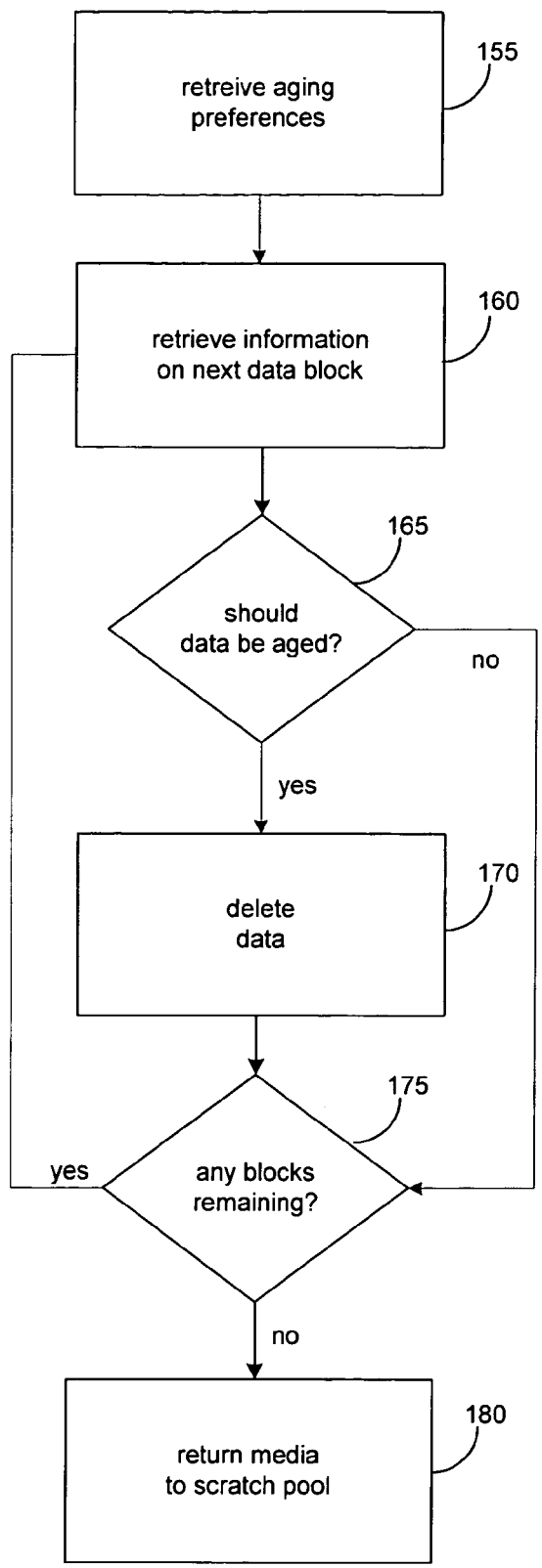
FIG. 3 is a flow chart of a method for reducing removable media usage according to an embodiment of the invention.

With reference to FIGS. 1 through 3, embodiments of the invention are presented. FIG. 1 presents a block diagram of a network architecture for a system to perform storage operations on electronic data in a computer network according to an embodiment of the invention. As shown, the system includes a storage manager 100 and one or more of the following: a client 85, an information store 90, a data agent 95, a media agent 105, an index cache 110, and a storage device 115. The system and elements thereof are exemplary of a three-tier backup system such as the CommVault Galaxy backup system, available from CommVault Systems, Inc. of Oceanport, N.J., and further described in application Ser. No. 09/610,738 which is incorporated herein by reference in its entirety.

A data agent 95 is generally a software module that is generally responsible for archiving, migrating, and recovering data of a client computer 85 stored in an information store 90 or other memory location. Each client computer 85 has at least one data agent 95 and the system can support many client computers 85. The system provides a plurality of data agents 95 each of which is intended to backup, migrate, and recover data associated with a different application. For example, different individual data agents 95 may be designed to handle Microsoft Exchange data, Lotus Notes data, Microsoft Windows 2000 file system data, Microsoft Active Directory Objects data, and other types of data known in the art.

If a client computer 85 has two or more types of data, one data agent 95 is generally required for each data type to archive, migrate, and restore the client computer 85 data. For example, to backup, migrate, and restore all of the data on a Microsoft Exchange 2000 server, the client computer 85 would use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85.

The storage manager 100 is generally a software module or application that coordinates and controls the system. The storage manager 100 communicates with all elements of the system including client computers 85, data agents 95, media agents 105, and storage devices 115, to initiate and manage system backups, migrations, and recoveries.

A media agent 105 is generally a software module that conducts data, as directed by the storage manager 100, between the client computer 85 and one or more storage devices 115 such as a tape library, a magnetic media storage device, an optical media storage device, or other storage device. The media agent 105 is communicatively coupled with and controls the storage device 115. For example, the media agent 105 might instruct the storage device 115 to use a robotic arm or other means to load or eject a media cartridge, and to archive, migrate, or restore application specific data. The media agent 105 generally communicates with the storage device 115 via a local bus such as a SCSI adaptor. In some embodiments, the storage device 115 is communicatively coupled to the data agent 105 via a Storage Area Network ("SAN").

Each media agent 105 maintain an index cache 110 which stores index data the system generates during backup, migration, and restore storage operations as further described herein. For example, storage operations for Microsoft Exchange data generate index data. Index data provides the system with an efficient mechanism for locating user files for backup, recovery, and archiving operations. Files backed up by a media agent 105 or associated with the media agent 105, for example, are tracked in the index cache 110 of the media agent 105 performing a backup. A media agent 105 index cache 110, for example, might track media agent associations with backed up files, media agent associations with primary copies, file names, backup dates, client information associated with backed up files, primary copy information, file sizes, file locations, pointers to file locations, and other file-related information tracked by file systems known in the art.

This index data is generally stored with the data backed up to the storage device 115, and the media agent 105 that controls the storage operation also writes an additional copy of the index data to its index cache 110. The data in the media agent 105 index cache 110 is thus readily available to the system for use in storage operations and other activities without having to be first retrieved from the storage device 115.

The storage manager 100 also maintains an index cache 110. Index data is also used to indicate logical associations between components of the system, user preferences, management tasks, and other useful data. In some embodiments, data stored in the storage manager 100 index cache 110 includes file system data regarding backed up data including media agent associations with backed up files, media agent associations with primary copies, file names, backup dates, client information associated with backed up files, primary copy information, file sizes, file locations, pointers to file locations, and other file-related information tracked by file systems known in the art. As another example, example, the storage manager 100 might use its index cache 110 to track logical associations between media agents 105 and storage devices 115.

Index caches 110 typically reside on their corresponding storage component's hard disk or other fixed storage device. Like any cache, the index cache 110 has finite capacity and the amount of index data that can be maintained directly corresponds to the size of that portion of the disk that is allocated to the index cache 110. In one embodiment, the system manages the index cache 110 on a least recently used ("LRU") basis as known in the art. When the capacity of the index cache 110 is reached, the system overwrites those files in the index cache 110 that have been least recently accessed with the new index data. In some embodiments, before data in the index cache 110 is overwritten, the data is copied to an index cache 110 copy in a storage device 115. If a recovery operation requires data that is no longer stored in the index cache 110, such as in the case of a cache miss, the system recovers the index data from the index cache 110 copy stored in the storage device 115.

In some embodiments, components of the system may reside and execute on the same computer. In some embodiments, a client computer 85 component such as a data agent 95, a media agent 105, or a storage manager 100 coordinates and directs local archiving, migration, and retrieval application functions as further described in application Ser. No. 09/610,738. This client computer 85 component can function independently or together with other similar client computer 85 components.

Turning to FIG. 2 for example, a block diagram is shown depicting incremental block level changes occurring in a series of storage operations according to an embodiment of the invention. As shown, the diagram presents a first storage operation 120, a second storage operation 125, a third storage operation 130, a fourth storage operation 135, a fifth storage operation 140, a sixth (or $n^{th}$) storage operation 145, and a number of blocks 150 backed up. The first storage operation 120 is a full backup of a client 85, such as a client 85 information store 90, consisting of six blocks 150 $A_0$, $B_0$, $C_0$, $D_0$, $E_0$, and $F_0$. The first storage operation 120 stores a full backup of the blocks 150 in their original or base state. The storage manager 100 monitors the information store 90 for changes that occur to the blocks 150 since the first full backup 120 is made.

For example, the second storage operation 125 is an incremental backup of the information store 90 blocks that changed since the first storage operation 120. An incremental backup stores only copies of those elements of the data that have changed since a previous storage operation. As shown, only $A_0$, $B_0$, and $E_0$ have changed since the first storage operation 120, thus the system takes an incremental backup and stores only the changed blocks $A_1$, $B_1$, and $E_1$. The third storage operation 130 is also an incremental backup and stores copies of only those blocks that changed since the second incremental backup 125. Thus, $C_1$ and $E_2$ are stored. The fourth storage operation 135 is another incremental backup and stores copies of blocks $A_2$ and $D_1$. The fifth storage operation 140 is another incremental backup and stores a copy of block $A_2$.

Storage operations continue indefinitely until another full backup is made. The sixth storage operation 145 presents another full backup of the information store 90. The sixth storage operation 145 stores a full backup of the blocks 150 capturing the changes that occurred to all the blocks 150 since the first storage operation 120. In some embodiments, the sixth storage operation 145 is made as a synthetic storage operation. A synthetic storage operation takes a previous full backup of a volume and incorporates changes to the previous full backup recorded in one or more incremental backups to create an updated full backup without using the system resources that would be required to make a second full backup directly from the information store 90 itself. For example, here the sixth storage operation 145 is a full backup of the information store 90 created by combining the most recent change to $A_0$ stored as $A_3$ on the fifth storage operation 140, the most recent change to $B_0$ stored as $B_1$ on the second storage operation 125, the most recent change to $C_0$ stored as $C_1$ on the third storage operation 130, the most recent change to $D_0$ stored as $D_1$ on the fourth storage operation 135, the most recent change to $E_0$ stored as $E_2$ on the third storage operation 130, and $F_0$ (which has not changed) from the first full backup 140. Since the sixth storage operation 145 is a full backup of the information store 90 created via synthetic copy, the system does not need to take another full backup of the information store 90

FIG. 3 presents a flow chart of a method for reducing removable media usage according to an embodiment of the invention. The system retrieves aging preferences, step 155. For example, the storage manager retrieves and consult a storage policy which specifies, among other things, storage patterns and aging policies for backup data stored in primary copies and other copies. For example, a storage policy might specify that client data be backed up once a week with a full backup, backed up daily using incremental backups between full backups, and retained 3 weeks before aging.

The system retrieves information from the first stored file or other block of data to determine whether the file or block should be aged or retained, step 160. For example, the storage manager 100 communicates storage policy retention and aging criteria to a media agent 105. In some embodiments, the aging and retention criteria is specified according to a user preference or as otherwise directed by a user. The media agent 105 consults file system data stored in its index cache 110 regarding backed up files and other blocks of data associated with the media agent 105. For example, the media agent may consult its index cache 119 to determine the backup date of files stored on tapes or other removable media in a storage device 115 such as a tape library or CD-jukebox.

The system determines whether or not the data should be aged, step 165. If the backup date of the data is less than the retention or aging criteria specified by the storage policy or other aging criteria, then the data is retained and not aged. If the backup date of the data is greater than the retention or aging criteria specified by the storage policy or other aging criteria, however, the data is aged by the system.

The system deletes data which is past the aging deadline, step 170. The system deletes index cache 110 entries that are associated with the data and stored index caches 110 or other storage memories of the media agent 105, the storage manager 100, and other components of the system. For example, if the system determines that an incremental backup should be aged and deleted, then the system deletes the file name, pointers to the data, and other information associated with the data and stored in the index caches 110 of the media agent 105 and storage manager 100. In some embodiments, the system deletes incremental backups, full backups, synthetic backups, differential backups, and all other types of data that satisfy the aging criteria. In some embodiments, the system only deletes pointers and other index cache references to data that satisfies the aging criteria. In other embodiments, the system also writes over the data itself using low level formatting techniques or other erasure known in the art to prevent data from being recovered.

The system determines whether any files or other blocks of data remain to check against the aging criteria, step 175. If there are remaining files or other blocks of data to check, then control returns to step 160 and the next file or other block of data is evaluated. Otherwise, removable media, such as magnetic and optical removable media, which previously stored data now aged by the system is returned to the media scratch pool for reuse and the routine exits, step 180.

Thus, in some embodiments, the system may retain all data (full, incremental, and other backups) for a given period of time, and then selectively age only certain portions of the backed up data. For example, the system may retain only full backups after three weeks, and then delete incremental backups stored on a tape set holding the primary copy. The primary copy or tape set only stores full backups after three weeks, and media in the primary copy or tape set storing incremental backups longer than three weeks can thus be returned to the media scratch pool and reused once the data is aged.

Some of the embodiments of the present invention leverage existing features of the CommVault Galaxy backup system. It will be recognized by those skilled in the art, however, that the embodiments of the present invention may be applied independently of the Galaxy system.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information. Backups described herein may comprise any copies of data including snapshots, archival copies, differential copies, or other copies suitable for the purposes herein described.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computer-implemented method for storing and retaining data stored on storage media, wherein the storage media comprises a data set including a plurality of data elements, the method comprising:

creating a full backup of data elements in the data set;

creating a plurality of incremental backups of the data elements, wherein the incremental backups comprise data elements that have been modified since the creation of the full backup;

storing the created full backup and the created incremental backups to storage media; and managing retention of the data stored on the storage media, including:

preventing overwrites to the storage media upon determining the storage media contains at least one incremental backup or full backup that satisfies a retention criteria, wherein the determining includes: for each incremental backup and full backup stored on the storage media:

obtaining an aging preference, wherein the aging preference includes a time period beginning at a time of creation of the incremental backup or the full backup that defines a period of retention for the incremental backup or the full backup, wherein the period of retention for the full backup is different than the period of retention for at least one of the plurality of incremental backups;

retrieving index data indicating the date of creation of the incremental backup or the full backup;

comparing the retrieved index data with the obtained aging preference; and determining that the incremental backup or full backup satisfies the retention criteria based on the comparison; and allocating the storage media to a scratch pool comprising a set of media to be overwritten upon determining no incremental backups or full backups satisfy the retention criteria.

2. The method of claim 1, further comprising freeing a portion of storage media, previously used to store the data elements, for other storage usage.

3. The method of claim 1, further comprising:

deleting the data elements from a portion of the storage media.

4. The method of claim 1, wherein obtaining an aging preference comprises obtaining an aging preference from a storage policy.

5. The method of claim 1, wherein the data elements are data blocks.

6. A system for storing and retaining data stored on storage media, wherein the storage media comprises a data set including a plurality of data elements, the system comprising:

a backup component, wherein the backup component is configured to create a full backup of data elements in the data set and to create a plurality of incremental backups of the data elements, wherein the incremental backups comprise data elements that have been modified after creation of the full backup;

a storage component, wherein the storage component is configured to store the created full backup and the created incremental backups to storage media
wherein the storage component includes a tape library, magnetic media storage device, optical media storage device, tape drive, optical library, Redundant Array of Inexpensive Disks (RAID), or CD-ROM jukebox;

a management component, wherein the management component is configured to overwrite at least a portion of the storage media upon determining the storage media contains at least one incremental backup or full backup that does not satisfy a retention criteria, wherein the determining includes:
for each incremental backup and full backup stored on the storage media:
obtaining an aging preference, wherein the aging preference includes a time period beginning at a time of creation of the incremental backup or the full backup that defines a period of retention for the incremental backup or the full backup,
wherein the period of retention for the full backup is different than the period of retention for at least one of the plurality of incremental backups;
retrieving index data indicating the date of creation of the incremental backup or the full backup;
comparing the retrieved index data with the obtained aging preference; and
determining that the incremental backup or full backup satisfies the retention criteria based on the comparison; and
allocating the storage media to a scratch pool comprising a set of media to be overwritten upon determining at least one incremental backup or full backup does not satisfy the retention criteria.

7. A system for storing and retaining data stored on storage media, the system comprising:
a means for creating a full backup of data elements in a data set;
a means for creating a plurality of incremental backups of the data elements,
wherein the incremental backups comprise data elements that have been modified after creation of the full backup;
a means for storing the created full backup and the created incremental backups to storage media,
wherein the means for storing includes a tape library, magnetic media storage device, optical media storage device, tape drive, optical library, Redundant Array of Inexpensive Disks (RAID), or CD-ROM jukebox;
a means for preventing overwrites to the storage media upon determining the storage media contains at least one incremental backup or full backup that satisfies a retention criteria, wherein the means for blocking overwrites includes:
a means for obtaining an aging preference, wherein the aging preference includes a time period beginning at a time of creation of the incremental backup or the full backup that defines a period of retention for the incremental backup or the full backup, and wherein further the period of retention for the full backup is different than the period of retention for at least one of the plurality of incremental backups;
a means for retrieving index data indicating the date of creation of the incremental backup or the full backup;
a means for comparing the retrieved index data with the obtained aging preference; and
a means for determining that the incremental backup or full backup satisfies the retention criteria based on the comparison; and
a means for allocating the storage media to a scratch pool comprising a set of media to be overwritten upon determining no incremental backups or full backups satisfy the retention criteria.

8. Computer-readable memory whose contents cause a data storage system to perform a method of storing and retaining data stored on storage media, wherein the storage media contains a data set including a plurality of data elements, the method comprising:
creating a full backup of data elements in the data set;
creating a plurality of incremental backups of the data elements, wherein the incremental backups comprise data elements that have been modified since the creation of the full backup;
storing the created full backup and the created incremental backups to storage media;
managing retention of the data stored on the storage media, including:
preventing overwrites to at least a portion of the storage media upon determining the storage media contains at least one incremental backup or full backup that satisfies a retention criteria, wherein the determining includes, for each incremental backup and full backup stored on the storage media:
obtaining an aging preference, wherein the aging preference includes a time period of the incremental backup or the full backup that defines a period of retention for the incremental backup or the full backup, wherein further the period of retention for the full backup is different than the period of retention for at least one of the plurality of incremental backups;
retrieving index data indicating the date of creation of the incremental backup or the full backup;
comparing the retrieved index data with the obtained aging preference; and
determining that the incremental backup or full backup satisfies the retention criteria based on the comparison; and
allocating the storage media to a scratch pool comprising a set of media to be overwritten upon determining no incremental backups or full backups satisfy the retention criteria.

* * * * *